United States Patent
Miller

(10) Patent No.: US 7,239,971 B2
(45) Date of Patent: Jul. 3, 2007

(54) METHOD AND APPARATUS FOR CALIBRATING COMMUNICATIONS CHANNELS

(75) Inventor: Charles A. Miller, Fremont, CA (US)

(73) Assignee: FormFactor, Inc., Livermore, CA (US)

( * ) Notice: Subject to any disclaimer, the term of this patent is extended or adjusted under 35 U.S.C. 154(b) by 51 days.

(21) Appl. No.: 10/826,715

(22) Filed: Apr. 16, 2004

(65) Prior Publication Data

US 2005/0234669 A1 Oct. 20, 2005

(51) Int. Cl.
*G01R 35/00* (2006.01)
(52) U.S. Cl. .............................. 702/89; 702/69; 702/85
(58) Field of Classification Search ................. 702/89, 702/106, 69, 65, 71; 73/1.42
See application file for complete search history.

(56) References Cited

U.S. PATENT DOCUMENTS

| | | | |
|---|---|---|---|
| 4,249,258 A | 2/1981 | Craven | |
| 4,660,197 A | 4/1987 | Wrinn et al. | |
| 4,814,689 A * | 3/1989 | Obara | .......... 324/617 |
| 4,827,437 A | 5/1989 | Blanton | |
| 5,139,328 A | 8/1992 | Baker et al. | |
| 5,216,673 A | 6/1993 | Kanai | |
| 5,590,137 A | 12/1996 | Yamashita | |
| 5,712,427 A | 1/1998 | Matthews | |
| 5,811,655 A * | 9/1998 | Hashimoto et al. | .......... 73/1.42 |
| 5,884,236 A | 3/1999 | Ito | |
| 6,105,157 A | 8/2000 | Miller | |
| 6,189,382 B1 | 2/2001 | Johnson | |
| 6,224,180 B1 | 5/2001 | Pham-Van-Diep et al. | |
| 6,449,568 B1 * | 9/2002 | Gerrish | .......... 702/60 |
| 6,460,152 B1 | 10/2002 | Demidov et al. | |
| 6,469,514 B2 | 10/2002 | Okayasu | |
| 6,594,273 B1 * | 7/2003 | McGibney | .......... 370/442 |
| 6,609,077 B1 | 8/2003 | Brown et al. | |
| 6,708,123 B2 | 3/2004 | Gerrish | |

* cited by examiner

*Primary Examiner*—John Barlow
*Assistant Examiner*—Jonathan Moffat
(74) *Attorney, Agent, or Firm*—N. Kenneth Burraston

(57) ABSTRACT

A periodic signal is driven onto a transmission line, and the frequency of the periodic signal is varied from an initial frequency that corresponds to a quarter wave or half wave of an estimated length of the transmission line. A null or a peak in the envelope of the voltage or current wave induced on the transmission line by the periodic signal is detected at or near the end of the transmission line onto which the signal is driven. The frequency of the periodic signal that caused the null or peak may be used to calculated the length of the transmission line or a propagation delay through the transmission line. A plurality of transmission lines may be deskewed by determining the propagation delay through each transmission line and adjusting a variable delay in each transmission line so that the transmissions lines approximately equal overall propagation delays.

39 Claims, 8 Drawing Sheets

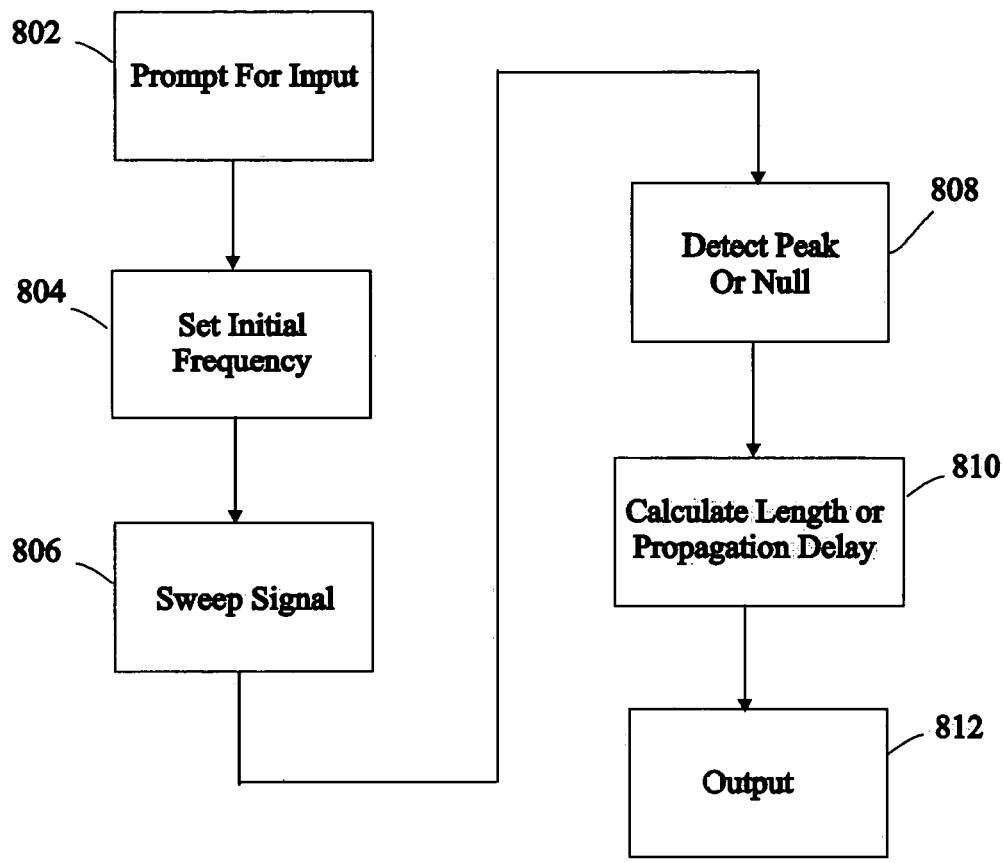
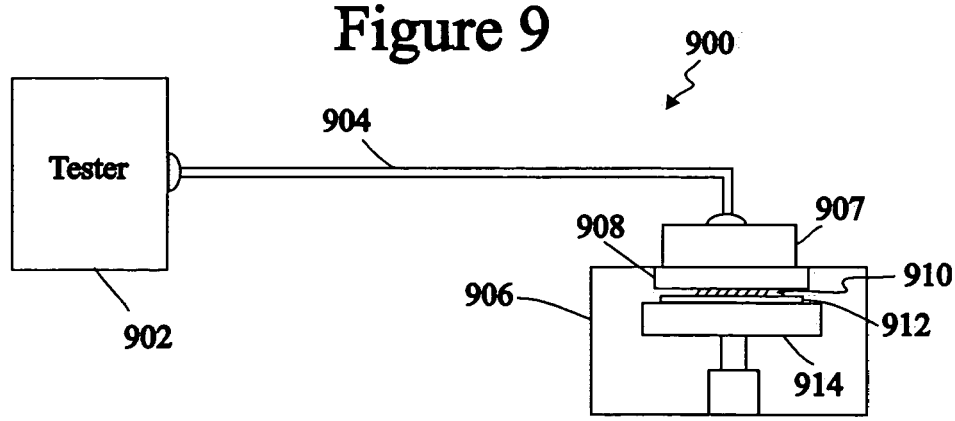

METHOD AND APPARATUS FOR CALIBRATING COMMUNICATIONS CHANNELS

BACKGROUND

Many different types of transmission lines exist and are used for a variety of purposes. For example, transmission lines are often used as the media that carries data over long distances, medium distances, and short distances. A transmission line may be anything from a coaxial cable carrying data signals over long distances to an almost microscopic metal trace that carries signals within tiny integrated circuits. As is known, a signal driven onto one end of a transmission line reflects off of the other end of the transmission line unless the other end of the transmission line is terminated with an impedance that matches the characteristic impedance of the transmission line. As is also known, driving a periodic signal onto a transmission line may cause voltage and/or current wave patterns with distinct characteristics to be induced on the transmission line. For example, a periodic signal whose frequency corresponds to a quarter wave or a half wave of the length of a transmission will typically generate a resonate standing wave on the transmission line if the transmission line is terminated in an open circuit or a short circuit.

Under certain circumstances, it may be advantageous to determine the length of, propagation delay through, or other characteristic of a transmission line. As just one (non-limiting) example, there are circumstances in which it would be advantageous to adjusts the propagation delay through a plurality of transmission lines so that signals driven through the transmission lines arrive at their destinations at the same time or within a specified tolerance. For this and other applications, it would be advantageous to utilize wave reflection properties of a transmission line to determine one or more characteristics of the transmission line.

BRIEF SUMMARY

In an exemplary embodiment of the invention, a periodic signal is driven onto a transmission line, and the frequency of the periodic signal is varied. The initial frequency of the periodic signal may be selected to correspond to a quarter wave or half wave of an estimated length of the transmission line. A null or a peak in the envelope of the voltage or current wave induced on the transmission line by the periodic signal is detected at or near the end of the transmission line onto which the signal is driven. The frequency of the periodic signal that caused the null or peak may be used to calculate the length of the transmission line or a propagation delay through the transmission line. A plurality of transmission lines may be deskewed by determining the propagation delay through each transmission line and adjusting a variable delay in each transmission line so that the transmissions lines have approximately equal overall propagation delays.

BRIEF DESCRIPTION OF THE DRAWINGS

FIG. 8 illustrates exemplary operation of the processor 710 of FIG. 7.

FIG. 9 shows a simplified block diagram of a system for testing electronic devices.

DETAILED DESCRIPTION OF EXEMPLARY EMBODIMENTS

This specification describes exemplary embodiments and applications of the invention. The invention, however, is not limited to these exemplary embodiments and applications or to the manner in which the exemplary embodiments and applications operate or are described herein.

Figure 1:
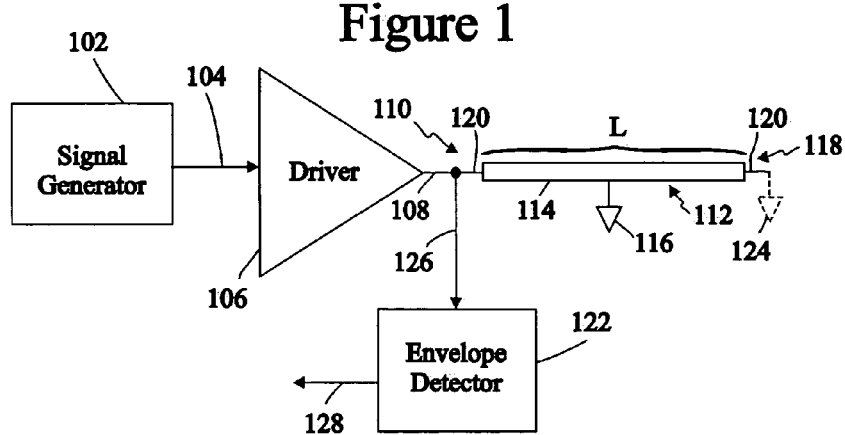
FIG. 1 is a simplified block diagram of a system that may be used to determine the length or propagation delay of transmission line 112.

FIG. 1 illustrates a simplified block diagram of an exemplary system for determining the length and/or propagation delay through a transmission line 112. Although schematically shown as a coaxial cable in FIG. 1, transmission line 112 may be any type of transmission line, including without limitation a coaxial cable, a twisted pair, a strip line, a microstrip, a trace, etc. Indeed, transmission line 112 may comprise a combination of any of the foregoing and may further include vias, switches, electronics etc. The transmission line 112 shown in FIG. 1 includes a signal line 120 that carries the signal current and a return line 114, which may connected to ground 116 as shown in FIG. 1. A proximal end 110 of the transmission line is connected to the output 108 of a driver 106. The distal end 118 of transmission line 112 may be left open or, the transmission line may alternatively be shorted by connecting the distal end 118 to ground 124. A signal generator 102 generates a periodic signal that is input 104 into driver 106, which drives the periodic signal onto transmission line 112. Transmission line 112 has a length "L," and the input 126 of an envelope detector 122 is connected to the transmission line 112 along its length "L" at or near its proximal end 110. A non-limiting example of an envelope detector is a circuit for demodulating an amplitude modulated (AM) signal. The input 126 of the envelope detector 122 may be AC coupled (e.g., through a capacitor) to the transmission line 112.

Figure 2:
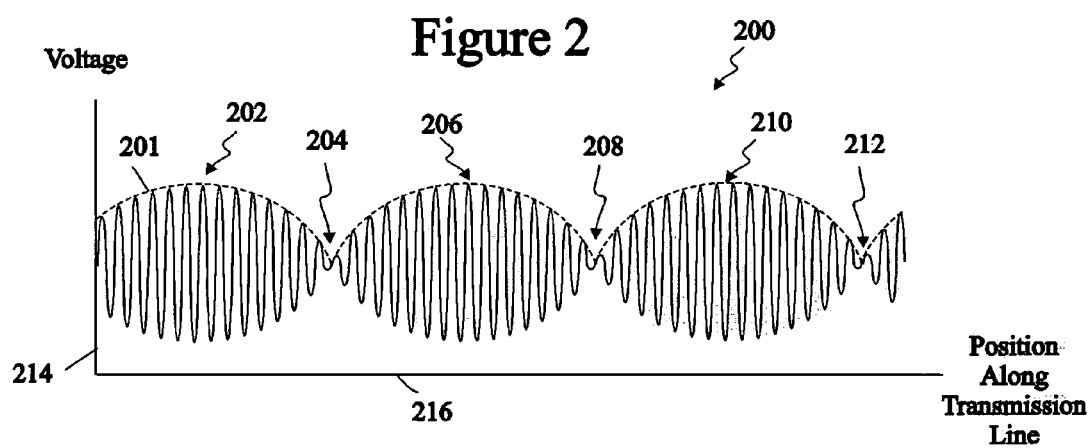
FIG. 2 shows a standing wave that may be induced on the transmission line 112 of FIG. 1.

As is known, a signal driven by driver 106 onto the proximal end 110 of the transmission line 112 propagates down the transmission line and reflects off of the distal end 118 back up the transmission line. A periodic signal driven by driver 106 onto transmission line 112 may result in a voltage wave pattern on transmission line 112. FIG. 2 illustrates such a standing wave 200. As shown, FIG. 2 shows a standing voltage wave 200 in which the horizontal axis 216 represents position along the length of transmission line 112, and the vertical axis 214 represents the voltage difference between-the signal line 120 and the return line 114 of transmission line 112. In FIG. 2, the vertical axis 214 represents the proximal end 110 of the transmission line 112, which is where the input 126 of envelope detector 122 is connected to transmission line 112.

As shown in FIG. 2, the envelope 201 of such a wave pattern may be periodic and may include voltages peaks (e.g., 202, 206, and 210) and nulls (e.g., 204, 208, and 212). As is known, if the periodic signal driven onto the transmission line 112 has a wavelength that is a quarter of the length "L" of the transmission line 112 or is a multiple of a quarter of the length "L," a peak (e.g., 202, 206, 210) or a null (e.g., 204, 208, 212) of the voltage envelope 201 occurs at the proximal end 110 of the transmission line 112. The same is true if the periodic signal that has a wavelength that is a half or a multiple of a half of the length "L" of transmission line 112. For both a quarter wave signal (e.g., a signal with a wavelength that is one fourth or a multiple of one fourth of the length "L") and a half wave signal (e.g., a signal with a wavelength that is one half or a multiple of one half of the length "L" of transmission line 112), whether a peak (e.g., 202) or a null (e.g., 204) occurs at the proximal end 110 (represented in FIG. 2 by axis 214) of transmission line 112 depends on whether the distal end 118 of transmission line 112 is open or shorted.

More specifically, if the distal end 118 of transmission line 112 is open and the signal driven onto the proximal end 110 of the transmission line has a quarter wavelength, then a null (e.g., 204) occurs at the proximal end 110 of transmission line 112. If the distal end 118 of transmission line 112 remains open but the signal driven onto the proximal end 110 of the transmission line has a half wavelength, then a peak (e.g., 202) occurs at the proximal end 110 of transmission line 112. On the other hand, if the distal end 118 of transmission line 112 is closed (shorted) and the signal driven onto the proximal end 110 of the transmission line has a quarter wavelength, then a peak (e.g., 202) occurs at the proximal end 110 of transmission line 112. If the distal end 118 of transmission line 112 remains closed (shorted) but the signal driven onto the proximal end 110 of the transmission line has a half wavelength, then a null (e.g., 204) occurs at the proximal end 110 of transmission line 112. Table I below summarizes the foregoing:

TABLE I

| Distal End | Wavelength | Voltage At Proximal End |
| --- | --- | --- |
| Open | quarter | Null |
| Open | half | Peak |
| Shorted | quarter | Peak |
| Shorted | half | Null |

As will be seen, signal generator 102 generates a periodic signal that driver 106 drives onto transmission line 112. The frequency of the signal generated by signal generator 102 is changed until the output 128 of the envelope detector 122, whose input 126 is connected at or near the distal end 110 of the transmission line 112, indicates a null or peak, which, as discussed above, indicates that the signal driven onto the transmission line 112 is a quarter wave or half wave signal (with respect to the length "L" of the transmission line). (How near the input 126 of envelope detector 122 should be connected to the proximal end 110 of the transmission line 112 depends on the precision desired or needed in determining the actual length of the transmission line 112 or the propagation delay through the transmission line.) Knowing the frequency of the signal and whether the driving signal is a quarter wave or a half wave signal, one can determine both the length "L" of the transmission line 112 and the propagation delay of a signal through the transmission line. This is because one can calculate the wavelength of the signal from the frequency of the signal, and one can calculate both the length "L" of and the propagation delay through the transmission line 112 from the wavelength.

As is known, the wavelength ($\lambda$) of a periodic electromagnetic signal propagating down a transmission line is equal to the frequency (f) of the signal multiplied by the propagation velocity ($v_p$) of the signal, which is equal to the speed of light in free space ("c") divided by the square root of the relative permeability ("$e_r$") of the dielectric material (not shown) between the signal line 120 and the return line 114 of the transmission line 112. Mathematical formulas for the foregoing are as follows: $\lambda = v_p \div f$, and $v_p = c \div \sqrt{e_r}$ (where $\sqrt{e_r}$ represents the square root of $e_r$). For a quarter wave signal, the length "L" of the transmission line 112 is one fourth the full wavelength (L=$\lambda \div 4$). Similarly, for a half wave signal, the length "L" is half the full wavelength (L=$\lambda \div 2$). The propagation delay through the transmission line is one fourth the inverse of the frequency (D=1÷(4*f)) for a quarter wave signal, and one half the inverse of the frequency (D=1÷(2*f)) for a half wave signal (where D is propagation delay).

Figure 3:
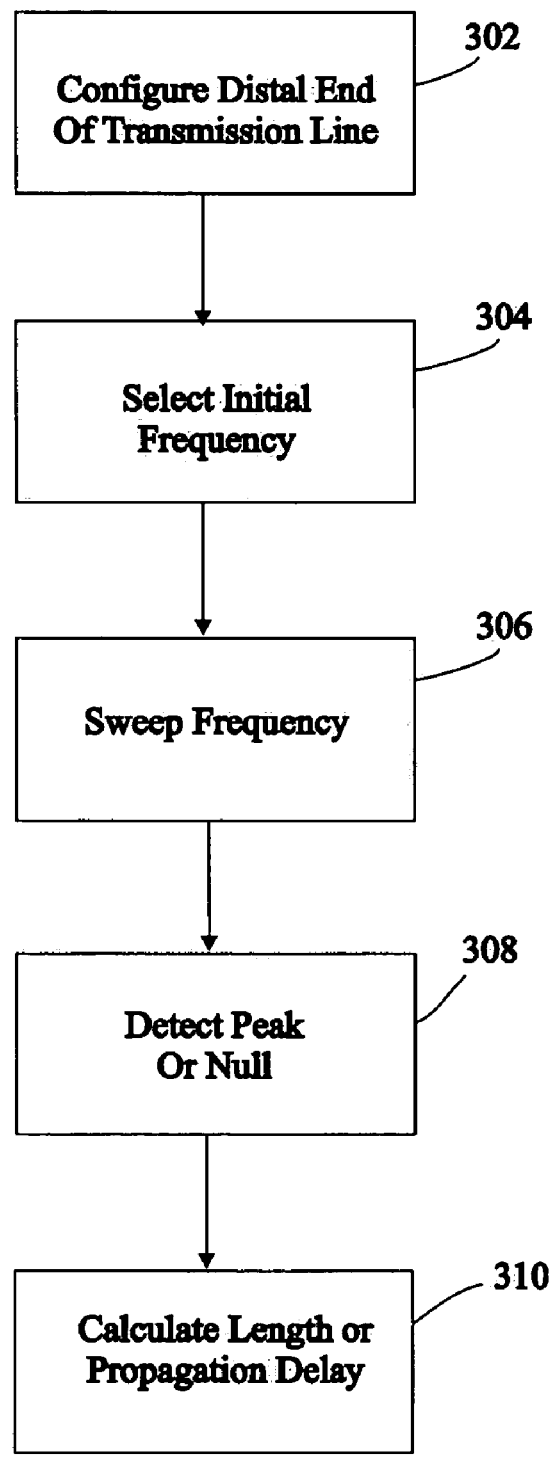
FIG. 3 illustrates an exemplary process for determining the length or propagation delay of transmission line 112 of FIG. 1.

FIG. 3 illustrates exemplary operation of the system of FIG. 1. At step 302, the distal end 118 of transmission line 112 is configured to be either open or shorted. As discussed above, the distal end 118 is left open by not connecting the signal line 120 to a conductive element; the distal end 118 is shorted by connecting the signal line 120 to ground 124 (assuming that the return line 114 is connected to ground as shown in FIG. 1). At step 304, an initial frequency setting for signal generator 102 is selected. There are any number of ways to select an initial frequency. For example, the initial frequency may be selected to correspond to a quarter wavelength or half wavelength of an estimated length "L" of the transmission line 112. Manipulating the equations discussed above, frequencies corresponding to a quarter wavelength and a half wavelength of the estimated length "L" of the transmission line 112 may be calculated as follows:

for quarter wavelength: $f_o = c \div (4 * L_{est} * \sqrt{e_r})$ for half wavelength: $f_o = c \div (2 * L_{est} * \sqrt{e_r})$ where:

* indicates multiplication $f_o$ is frequency $L_{est}$ is the estimated length of the transmission line 112

$\sqrt{e_r}$ is the square root of the relative permeability ("$e_r$") of the dielectric material (not shown) between the signal line 120 and the return line 114 of the transmission line 112 c is the speed of light through free space (which is approximately 3×10$^8$ meters/second). (Of course, using a more precise number for the speed of light will result in a more precise calculation.)

EXAMPLE

The following example shows use of the foregoing formulas to calculate an initial frequency at step 304 of FIG. 3 using the foregoing formulas. In this example, it is assumed that $\sqrt{e_r}$ is 2 and the estimated length ($L_{est}$) of the transmission line is 15 centimeters.

An initial frequency for a quarter wave signal would be as follows: $f_o = 3 \times 10^8 \div (4 * 0.15 * 2)$, which equals 250 megahertz.

An initial frequency for a half wave signal would be as follows: $f_o = 3 \times 10^8 \div (2 * 0.15*2)$, which equals 500 megahertz.

At step 306, signal generator 102 generates a periodic signal that is input 104 to driver 106, which drives the signal onto transmission line 112. The periodic signal may be any shape. For example, signal generator 102 may generate a sinusoidal, periodic signal that is input 104 into driver 106. As another example, signal generator 102 may include an internal filter (not shown) that passes to the input 104 of driver 106 only the fundamental wave, a particular harmonic wave, or a combination of the fundamental wave and a particular harmonic wave or particular harmonic waves so that only such a wave or combination of waves are driven onto the transmission line 112. Of course, such a filter or filters could be placed outside of the signal generator 102, such as between the signal generator 102 and the driver 106 or at the output 108 of the driver. Regardless of the filtering and shape of the signal, the frequency of the signal driven onto transmission line 112 should be the frequency selected at step 304.

As discussed above, driving the signal onto the transmission line 112 will cause a standing wave that may look generally like wave 200 in FIG. 2 to appear on transmission line 112. As also discussed above, the standing wave 200 in FIG. 2 does not correspond to a quarter wave or half wave signal with respect to the length "L" of transmission line 112 because neither a null nor a peak appears at axis 214, which, as mentioned above, corresponds to the point along the transmission line 112 where input 126 to envelope detector 122 is connected to the transmission line, which, as shown in FIG. 1, is preferably at or near the proximal end 110 of the transmission line 112. To find the signal whose frequency creates a null or peak at the proximal end 110 of the transmission line 112, the signal generator 102 is caused at step 306 to sweep the signal input 104 into driver 106 and driven onto the transmission line 112 through a range of frequencies starting with the initial frequency selected at step 304. The signal generator 102 may sweep the signal continuously and smoothly over the range, or the signal generator 102 may step the signal from one discrete frequency to another through the range. Preferably, the frequency range is selected to include a range of frequencies that correspond at least to a ¼ wave or a ½ wave of the initial frequency selected at step 304.

Figure 4A:
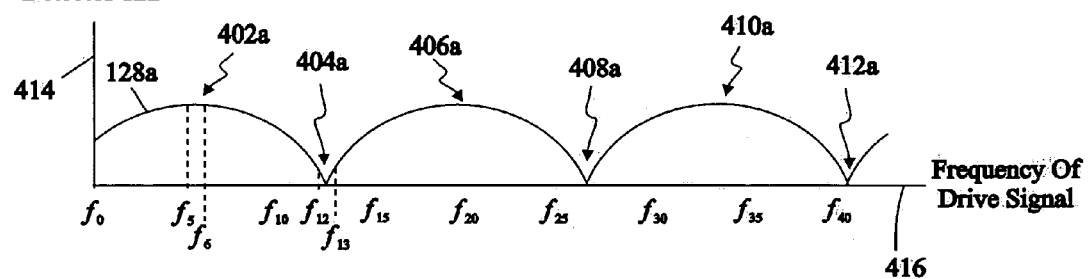
FIGS. 4a, 4b, 5a, and 5b illustrate exemplary envelope wave patterns generated by the envelope detector 122 of FIG. 1.
Figure 4B:
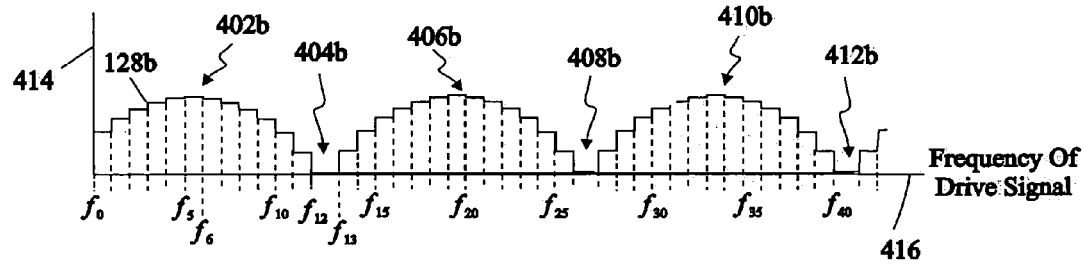

As the signal generator 102 sweeps the frequency range, envelope detector 122 receives at its input 126 the standing wave (e.g., like wave 200 shown in FIG. 2) and outputs 128 the envelope (e.g., like the envelope 201 shown in FIG. 2) of that standing wave as the standing wave varies with the change in the frequency of the signal driven onto the transmission line 112. FIG. 4a illustrates a plot of the output 128 of envelope detector 122 where the sweep through the frequency range is continuous and smooth, and FIG. 4b illustrates a plot of the output 128 where the sweep through the frequency range steps from one discrete frequency to another. The frequency sweep in both FIG. 4a and 4b are from the initial frequency $f_0$ selected at step 304 through $f_{45}$. (In both FIGS. 4a and 4b, the horizontal axis 416 represents the frequency of the signal driven onto transmission line 112, and the vertical axis 414 represents the voltage appearing at the output 128 of the envelop detector 122.) As mentioned above, a frequency that corresponds to a peak or null in FIG. 4a or FIG. 4b is a quarter wave or half wave signal with respect to the length "L" of the transmission line 112.

While sweeping the frequency of the signal driven onto transmission line 112 at step 306, the process of FIG. 3 looks at step 308 for a peak (e.g., 402a, 406a, 410a in FIG. 4a or 402b, 406b, 410b in FIG. 4b) or a null (e.g., 404a, 408a, 412a in FIG. 4a or 404b, 408b, 412b in FIG. 4b) in the envelope wave form (e.g., 128a in FIG. 4a or 128b in FIG. 4b) generated at the output 128 of envelope detector 122. It should be noted that steps 304 and 306 may occur concurrently or sequentially. Indeed, steps 304 and 306 may occur in part sequentially and in part concurrently, that is, execution of those steps may overlap.

Per table I above, one looks for a null or a peak at step 308 depending on whether the distal end 118 of the transmission line 112 was left open or shorted at step 302 and whether the initial frequency $f_0$ selected at step 304 was selected based on a quarter wave or a half wave of the estimated length "L" of the transmission line. That is, if the distal end 118 of the transmission line 112 is left open at step 302, then: one looks for a null at step 308 if the initial frequency selected at step 304 was based on a quarter wave of the estimated length of the transmission line 112; or one looks for a peak at step 308 if the initial frequency selected at step 304 was based on a half wave. On the other hand, if the distal end 118 of the transmission line 112 is shorted at step 302, then: one looks for a peak at step 308 if the initial frequency selected at step 304 was based on a quarter wave of the estimated length of the transmission line 112; or one looks for a null at step 308 if the initial frequency selected at step 304 was based on a half wave. Table II below summarizes the foregoing.

TABLE II

| Step 302 | Step 304 | Step 308 |
|---|---|---|
| Distal end 118 open | Initial frequency based on quarter wave | Look for null |
| Distal end 118 open | Initial frequency based on half wave | Look for peak |
| Distal end 118 shorted | Initial frequency based on quarter wave | Look for peak |
| Distal end 118 shorted | Initial frequency based on half wave | Look for null |

There are any number of ways to detect a peak or a null in the envelope waveforms 128a or 128b. Indeed, detecting a peak or null may be as simple as a user monitoring the displayed output of the envelope detector 122 until he or she visually sees a null or peak. (The user may also manually adjust the frequency of the signal driven onto the transmission line while looking at the displayed output of the envelope detector 122.) FIGS. 4a and 4b illustrate another exemplary way to detect a peak or a null, and FIGS. 5a and 5b illustrate yet another exemplary way.

The method illustrated in FIGS. 4a and 4b monitors the rate of change of the envelope (e.g., 128a in FIG. 4a or 128b in FIG. 4b). A peak occurs where the rate of change of the envelope goes from positive to negative. That is, where the envelope signal changes from increasing in value to decreasing in value, there is a peak. Conversely, where the rate of change of the envelope goes from negative to positive, there is a null. An example is shown in FIG. 4b. As shown in FIG. 4b, the envelope 128b increases in value from frequency $f_0$ through $f_5$. The change from $f_5$ to $f_6$, however, causes the envelope 128b to decease in value. Thus, one can determine that a peak 402b occurs at one of $f_5$ or $f_6$ or between $f_5$ and $f_6$. It can thus determined at step 308 in FIG. 3 that a peak occurs at $f_5$, $f_6$, or at a frequency between $f_5$ and $f_6$ (e.g., an average of $f_5$ and $f_6$). Of course, the smaller the increments between frequency steps in FIG. 4b, the greater the accuracy. Peak 402a in FIG. 4a may be similarly detected. For example, the slope of the envelope 128a may be analyzed to determine whether the envelope is increasing or decreasing in value at a particular frequency.

In like manner, a null may be detected by looking for a change from decreasing values of the envelope 128b to increasing values For example, in FIG. 4b, every change in frequency from $f_6$ or $f_{12}$ results in a decrease in the envelope 128b. The change from $f_{12}$ or $f_{13}$, however, causes the envelope 128b to increase. It can thus determined at step 308 in FIG. 3 that a null occurs at $f_{12}$, $f_{13}$, or at a frequency between $f_{12}$ and $f_{13}$ (e.g., an average of $f_{12}$ and $f_{13}$) Again, the smaller the increments between frequency steps in FIG. 4b, the greater the accuracy. Null 404a in FIG. 4a may be similarly detected (e.g., by examining the slope of the envelope to determine whether the envelope is increasing or decreasing at a particular frequency).

Figure 5A:
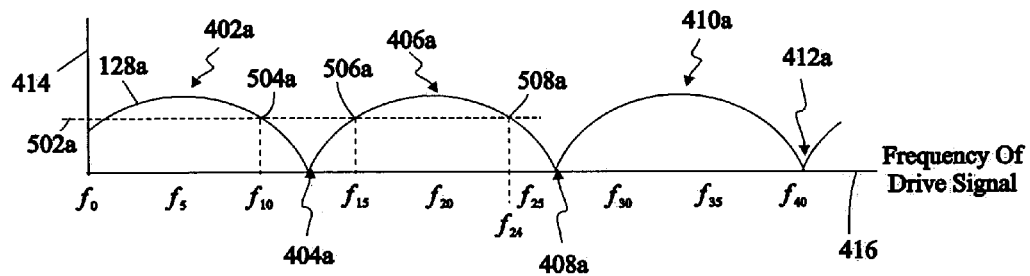
Figure 5B:
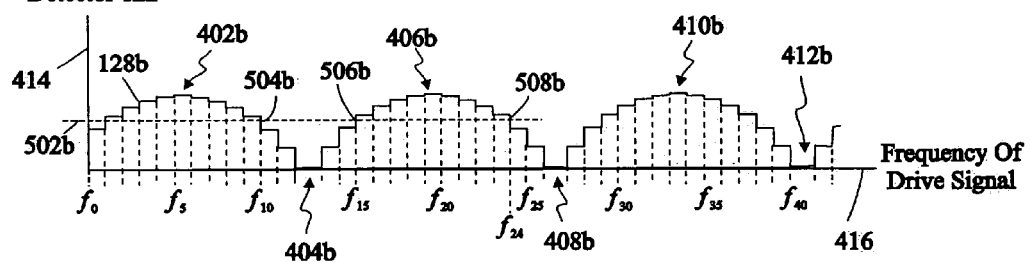

Like the method illustrated in FIGS. 4a and 4b, the method illustrated in FIGS. 5a and 5b also monitors the rate of change of the envelope (e.g., 128a in FIG. 5a or 128b in FIG. 5b). To find a peak or a null, the method illustrated in FIGS. 5a and 5b looks for a particular voltage level on the envelope signal output 128 by envelope detector 122. The method finds a pair of equal voltages (or equal within a specified tolerance) along the envelope. If the first voltage occurs while the envelope signal is increasing in value, then the average of the frequencies at the voltages in the pair corresponds to a peak. If, on the other hand, the first voltage occurs while the envelope signal is decreasing in value, then the average of the frequencies at the voltages in the pair corresponds to a null.

The foregoing is illustrated in both FIG. 5a and FIG. 5b. In FIG. 5a, voltage 502a is selected as the target voltage, and as can be seen, points 504a, 506a, and 508a represent points on envelope 128a that equal the target voltage 502a. As can be seen, voltage level 502a is detected on the envelope 128a while the signal driven onto the transmission line 112 has a frequency $f_{10}$, $f_{15}$, and $f_{24}$. It can thus be determined that a peak or null occurs between both the frequency pair $f_{10}$ and $f_{15}$ and the frequency pair $f_{15}$ and $f_{24}$. Indeed, the peak or null occurs at the average of the frequencies in each pair. That is, a peak or null occurs at frequency $f_{12.5}$ (the average of $f_{10}$ and $f_{15}$) and another peak or null occurs at frequency $f_{19.5}$ (the average of $f_{15}$ and $f_{24}$). It can be determined that frequency $f_{12.5}$ corresponds to a null 404a because the envelope signal 128a is decreasing at $f_{10}$ but increasing at $f_{15}$. Similarly, it can be determined that $f_{19.5}$ corresponds to a peak (406a) because the envelope signal 128a is decreasing at $f_{15}$ but increasing at $f_{24}$. Null 404b and peak 406b in FIG. 5b may be similarly detected, where 502b represents the target voltage and 504b, 506b, and 508b represent points along envelope signal 128b having the target voltage 502b. Optionally, at step 308, the process of FIG. 3 may detect two successive peaks or nulls, and the frequency in the below equations (used at step 310 to calculate actual length or propagation delay) may be the difference between the frequencies at the successive peaks and/or nulls.

Returning again to FIG. 3, once a peak or null is detected at step 308, the process of FIG. 3 calculates at step 310 the actual length of the transmission line 112. Alternatively or in addition, the propagation delay of a signal through the transmission line may be calculated. Manipulating the equations discussed above, the actual length of the transmission line 112 may be calculated as follows:

for quarter wavelength: $L_{act}=c \div (4*f_x*\sqrt{e_r})$ for half wavelength: $L_{act}=c \div (2*f_x*\sqrt{e_r})$ where:
* indicates multiplication
$f_x$ is frequency of the signal driven onto the transmission line 112 that resulted in a peak or null being detected at step 308
$L_{act}$ is the actual length of the transmission line 112
$\sqrt{e_r}$ is the square root of the relative permeability ("$e_r$") of the dielectric material (not shown) between the signal line 120 and the return line 114 of the transmission line 112
c is the speed of light through free space (which is approximately $3 \times 10^8$ meters/second).

Similarly, the propagation delay of a signal through the transmission line 112 may be calculated as follows:

for quarter wavelength: $D=1 \div (4*f_x)$ for half wavelength: $D=1 \div (2*f_x)$ where:
indicates multiplication
D is the propagation delay
$f_x$ is frequency of the signal driven onto the transmission line 112 that resulted in a peak or null being detected at step 308.

EXAMPLE

Referring again to the example described above in which $\sqrt{e_r}$ is 2 and the initial frequency ($f_o$) was calculated based on estimated length ($L_{est}$) of the transmission line of 15 centimeters ($f_o$=250 megahertz for a quarter wave signal or 500 megahertz for a half wave signal), the actual length $L_{act}$ of the transmission line 112 and the propagation delay D through the transmission line would be calculated as follows:

For a quarter wave length signal ($f_o$=250 megahertz as calculated above), and assuming that the frequency of the drive signal at which a null or peak was detected at step 308 $f_n$ is 255 megahertz:
$L_{act}=3 \times 10^8 \div (4*255 \times 10^6 *2)$, which is approximately 14.7 centimeters.
$D=1 \div (4*255 \times 10^6)$, which is approximately 0.98 nanoseconds.

For a half wave length signal ($f_o$=500 megahertz as calculated above), and assuming that the frequency corresponding to the null or peak detected at step 308 $f_n$ is 510 megahertz:
$L_{act}=3 \times 10^8 \div (2*510 \times 10^6 *2)$, which is approximately 14.7 centimeters.
$D=1 \div (2*510 \times 10^6)$, which is approximately 0.98 nanoseconds.

Figure 6:
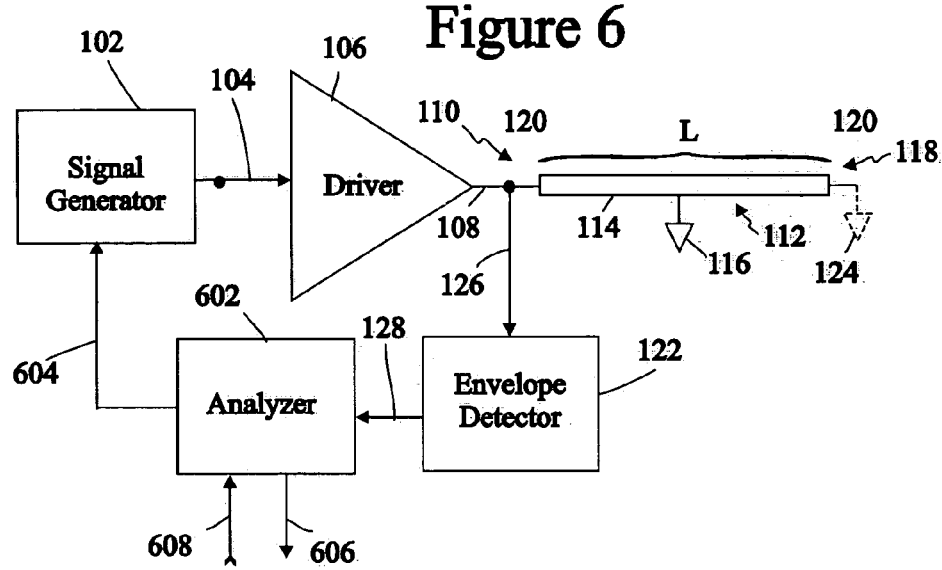
FIG. 6 is a simplified block diagram of another system that may be used to determine the length or propagation delay of transmission line 112
Figure 7:
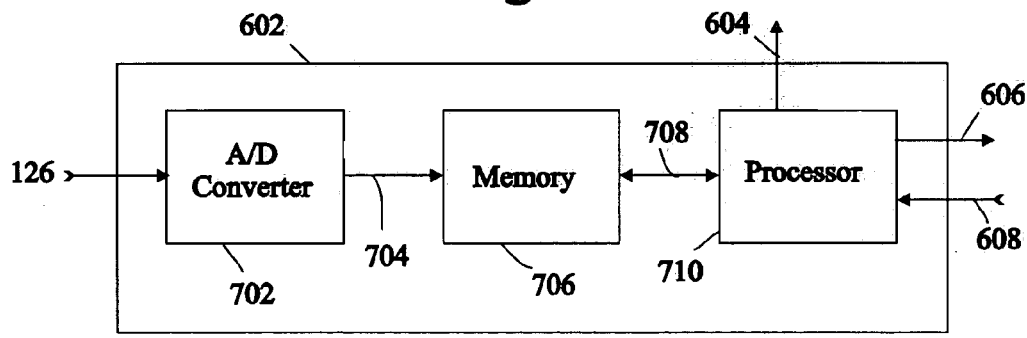
FIG. 7 is a simplified block diagram of the analyzer 602 of FIG. 6.

FIG. 6 illustrates a system that may be generally similar to the system shown in FIG. 1. FIG. 6, however, includes a digital analyzer 602 for receiving the output 128 of the envelope detector 122 and automatically determining the length "L" of the transmission line and/or the propagation delay through the transmission line. FIG. 7 illustrates a simplified block diagram of an exemplary implementation of the analyzer 602, and FIG. 8 illustrates exemplary operation of the processor 710 of FIG. 7.

Elements in FIG. 6 that are numbered the same as elements in FIG. 1 may be generally the same as described above with respect to FIG. 1. Analyzer 602 receives input 128 from the envelope detector 122. Analyzer 602 also includes input 608 through which a user or other equipment may enter data. Analyzer 602 also includes two outputs:

output 604 for controlling the signal generator 102, and output 606 for outputting results, which may be in the form of control signals.

As mentioned above, FIG. 7 illustrates a simplified block diagram of an exemplary implementation of the analyzer 602. As shown, FIG. 7 includes an analog-to-digital converter 702, a digital memory 706, and a processor 710. (As shown in FIG. 7. connector 704 connects analog-to-digital converter 702 and memory 706, and connector 708 connects memory 706 and processor 710.) Note that, if the envelope wave output 128 by envelope detector 122 is already in digital format (eg, the envelope wave 128b in FIG. 4b and FIG. 5b), analog-to-digital converter may not be needed. Memory 706 may be any type of digital memory, including silicon based memories, magnetic based memories, optical based memories, etc Processor 710 is preferably a microprocessor that operates under control of software (e.g., software, firmware, microcode, etc.) that resides in memory 706. Alternatively, processor may consist in part or in whole of hardwired logic circuits.

Turning now to FIG. 8, exemplary operation of the processor 710 of FIG. 7 will now be discussed. As mentioned above, the process of FIG. 8 may be implemented in software, which is run on processor 710, the process may be hardwired into processor 710, or the process may be implemented in a combination of software and hardwiring.

As shown in FIG. 8, at step 802, the processor 710 receives via input 608 data describing the set-up of transmission line 112 and optionally including a variety of possible parameters, all of which may be stored in memory 706. For example, the processor 710 may receive data indicating whether the distal end 118 of the transmission line 112 is open or shorted. Similarly, the processor 710 may receive data indicating whether the signals driven onto transmission line 112 are to be based on a quarter wave or a half wave of the estimated length "L" of transmission line 112. Processor 710 may also receive at step 802 an estimated length "L" of the transmission line 112.

At step 804, the processor 710 calculates an initial frequency setting for the signal generator 102; at step 806, the processor outputs control signal 604 to the signal generator 102, which causes signal generator 102 to generate and output 104 a periodic signal having the initial frequency set at step 804 and then sweep the frequency of that signal through a range or ranges of frequencies. At step 808, the processor 710 detects a peak or a null (or multiple peaks or multiple nulls) in the digitized envelope signal stored in memory 706. At step 810, the processor 710 calculates the actual length of the transmission line 112 and/or the propagation delay through the transmission line. Steps 804, 806, 808, and 810 may be performed in the same general manner as corresponding steps 304, 306, 308, and 310 in FIG. 3 and as described above. In FIG. 8, however, the processor 710 is programmed to perform these steps automatically (e.g., programmed in software or by hardwired logic). In FIG. 3, the steps may be performed manually or automatically or by a combination of manually and automatically performed actions. At step 812, processor 710 outputs via output 606 the results of its calculation or calculations. For example, processor 710 may output at step 812 the actual length of the transmission line 112 or the propagation delay through the transmission line as calculated at sep 810. This output 606 at step 812 may be in a visual format for a human user. Alternatively or in addition, the output 606 at step 812 may be in the form of control signals for controlling another piece of equipment. For example, output 606 generated at step 812 may be used to set a variable delay (not shown in FIG. 6) in transmission line 112. As yet another alternative, output 606 produced at step 812 may be output to an electronic storage device.

FIG. 9 illustrates a simplified block diagram of an exemplary test system 900 for testing electronic devices, such as semiconductor devices. For example, the test system 900 of FIG. 9 may test the dies of an unsingulated wafer, singulated dies (packaged or unpackaged), or multi-chip modules. Such a system 900 may be configured to test other types of electronic devices, such as printed circuit boards, as well.

Multiple communications channels (not shown) connect the tester 902 to the terminals of the electronic device 912 being tested (hereinafter the "device under test" or "DUT"). As shown, the DUT 912 may be supported by a moveable stage 914 and housed in a housing 906. The tester 902 generates test data, which is driven through the communications channels (not shown), to the terminals of the DUT 912. Response data generated by the DUT 912 travels in the reverse direction through such communications channels (not shown) back to the tester 902.

Each communications channel may, and typical does, comprise multiple media. For example, a communications channel may comprise a coaxial cable 904 from the tester 902 to a probe head 907, switches (not shown) and pin electronics (not shown) in the probe head 907, electrical connections (not shown) from the probe head 907 to a probe card 908, strip lines (not shown) and vias (not shown) through the probe card 908 to a probe 910 of the probe card, and a probe 910. Probes 910 make contact with terminals of the DUT 912, and thus probes 910 are the distal end of the communications channels.

Testing a DUT 912 may involve writing a plurality of test data to the DUT in parallel, and depending on the type of testing, it may be important that the parallel data arrive simultaneously (e.g., within a specified tolerance) at the DUT. Thus, calibrating each of the communications channels to have the same propagation delay (within a specified tolerance) may be important. Because the communications channels from the tester 902 to the DUT 912 are, in essence, transmission lines, the above described exemplary techniques (e.g., FIGS. 3 and 8) may be used in a test system 900 to measure and then deskew the propagation delays through the communications channels.

Figure 10:
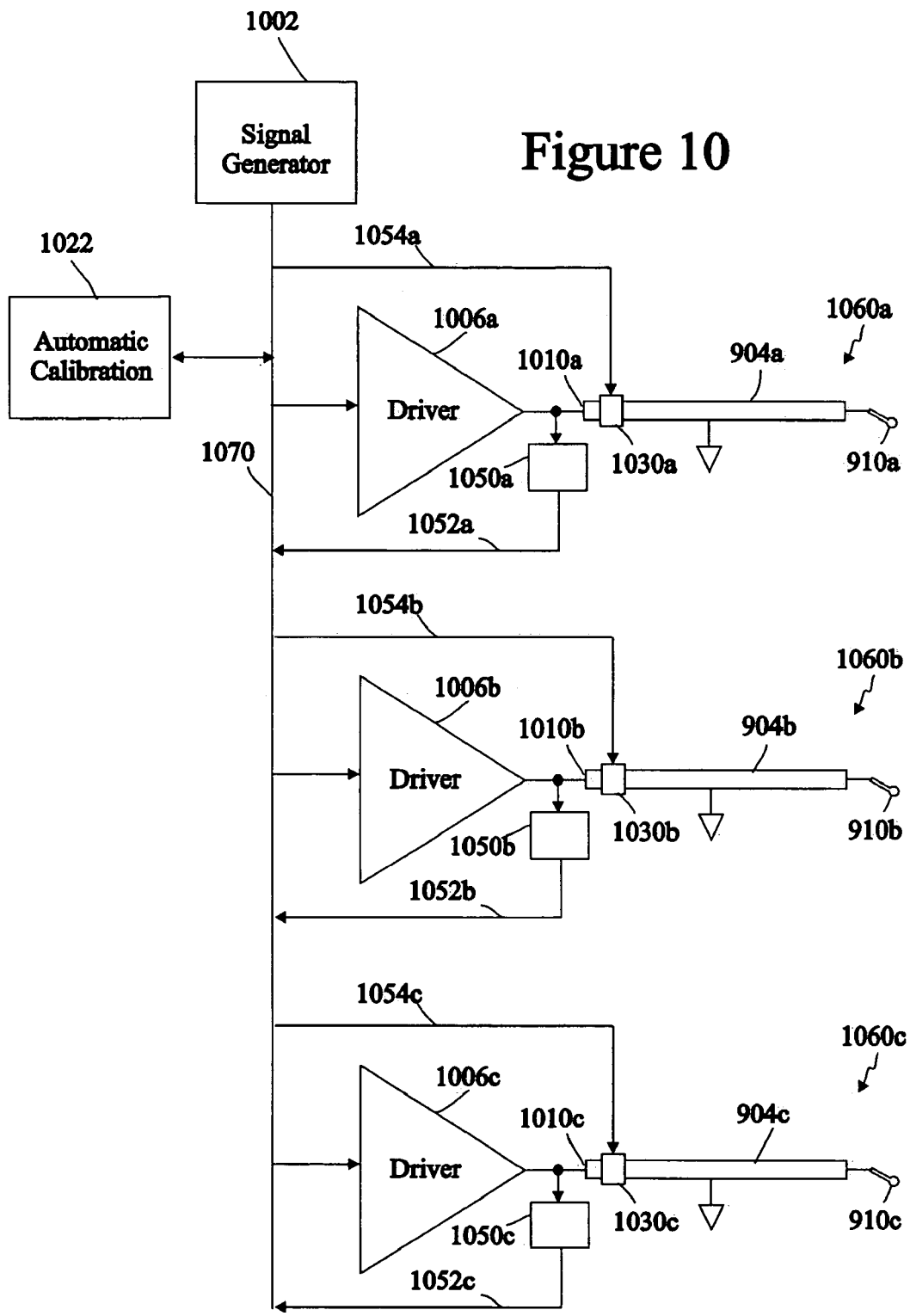
FIG. 10 is a simplified block diagram of a configuration that may be used to deskew a plurality of communications channels.

FIG. 10 illustrates a simplified block diagram of a portion of a test system, which may be similar to the test system 900 shown in FIG. 9, configured to automatically deskew communications channels. Three communications channels 1060a, 1060b, and 1060c—each depicted as a coaxial cable 904a, 904b, and 904c and a probe 910a, 910b, or 910c—are shown in FIG. 10. Of course, more or less than three communications channels may be involved. Per the discuss above regarding communications channels comprising multiple media, each communications channel 1060a, 1060b, and 1060c may include additional media. For example, using the example above, a communications channel (e.g., 1060a) may further include switches (not shown) and pin electronics (not shown) in a probe head 907 and strip lines (not shown) and vias (not shown) through a probe card 908. Note that communications channels 1060a, 1060b, and 1060c in FIG. 10 include probes 910a, 910b, and 910c, which are the distal ends of the communications channels.

As shown in FIG. 10, an analyzer 1050a, 1050b, and 1050c is associated with each of the communications channels 1060a, 1060b, and 1060c. Each analyzer 1050a, 1050b, and 1050c may be similar to a combination of the envelope detector 122 and analyzer 602 shown in FIG. 6, and each analyzer 1050a, 1050b, and 1050c may execute a process similar to the process shown in FIG. 8 to calculate the propagation delay through its associated channel 1060a, 1060b, and 1060c. (Each analyzer 1050a, 1050b, and 1050c may communicate with signal generator 1002 via bus 1070. As shown in FIG. 10, connectors 1052a, 1052b, and 1052c connect each analyzer 1050a, 1050b, and 1050c to bus 1070.) Each analyzer 1050a, 1050b, and 1050c may communicate the calculated propagation delay of its associated communications channel 1060a, 1060b, or 1060c to an automatic calibration module 1022 (again communicating through bus 1070). Automatic calibration module 1022 may then set a variable delay module 1030a, 1030b, and 1030c in each channel 1060a, 1060b, and 1060c so that the overall propagation delay through each of the channels 1060a, 1060b, and 1060c is the same or within a specified tolerance. (As shown in FIG. 10, automatic calibration module 1022 is connected to bus 1070, and connectors 1054a, 1054b, and 1054c connect variable delay modules 1030a, 1030b, and 1030c to bus 1070.) Variable delay modules 1030a, 1030b, and 1030c maybe implemented in any suitable fashion For example, these modules may be implemented as described in U.S. patent application Ser. No. 10/006,178, filed by Miller on Dec. 4, 2001, and entitled "Adjustable Delay Transmission Line," which is incorporated by reference herein in its entirety. As another example, these modules may be implemented by delaying input of a signal to a driver 1006a, 1006b, or 1006c. As another example, the tester 902 may maintain offset tables for varying starting a test signal on a particular channel in order to compensate for variations in the propagation delays through the channels.

Figure 11:
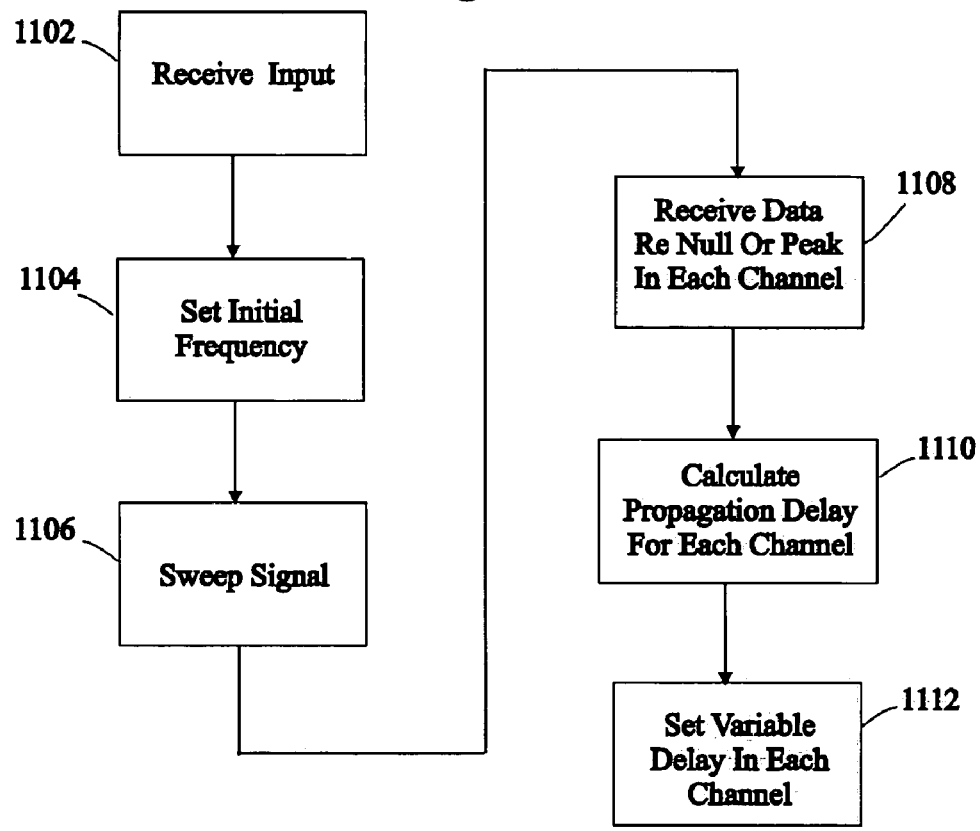
FIG. 11 illustrates exemplary operation of the automatic calibration module 1022 of FIG. 10.

The signal generator 1002, automatic calibration module 1022, drivers 1006a, 1006b, and 1006c, analyzers 1050a, 1050b, and 1050c, and variable delay modules 1030a, 1030b, and 1030c may be disposed in a tester 902 or may constitute separate equipment. In addition, at least some of the functionality of the analyzers 1050a, 1050b, and 1050c may be moved to the automatic calibration module 1022 or to other equipment. FIG. 11 illustrates exemplary operation of the automatic calibration module 1022 of FIG. 10 in which much of the functionality of the analyzers 1050a, 1050b, and 1050c is performed by the automatic calibration module 1022. In FIG. 11, the automatic calibration module 1022 controls overall calibration of communications channels 1060a, 1060b, and 1060c.

As shown in FIG. 11, at step 1102, automatic calibration module 1022 receives input data (e.g., from an operator) describing the set-up of communications channels 1060a, 1060b, and 1060c. This step may be generally similar to step 802 in FIG. 8, except that information is input for each of the communications channels 1060a, 1060b, and 1060c (each treated like transmission line 112 of FIG. 6). For example, the automatic calibration module 1022 may receive data indicating whether the distal ends (represented by probes 910a, 910b, and 910c) of the communications channels 1060a, 1060b, and 1060c are open or shorted. (For example, a channel 1060a, 1060b, or 1060c may be left open by not connecting its probe 910a, 916b, or 910c to a conductor, or a channel may be shorted by connecting its probe to ground.) The automatic calibration module 1.022 may also receive at step 1102 data indicating whether the calibration signals to be driven onto communications channels 1060a, 1060b, and 1060c are to be based on a quarter wave or a half wave of the estimated length "L" of one of the communications channels 1060a, 1060b, and 1060c. The automatic calibration module 1022 may also receive at step 1102 an estimated length "L" of one of the communications channels 1060a, 1060b, and 1060c.

At step 1104, the automatic calibration module 1022 calculates an initial frequency setting for the signal generator 1002; at step 1106, the automatic calibration module 1022 causes signal generator 1002 to generate a periodic calibration signal having the initial frequency set at step 1104 and then sweep the frequency of that signal through a range or ranges of frequencies. The automatic calibration module 1022 communicates with the signal generator 1002 through bus 1070, and the periodic signal generated by signal generator 1002 is input through bus 1070 to each of drivers 1006a, 1006b, and 1006c. Steps 1104 and 1106 may otherwise be generally similar to steps 804 and 806 in FIG. 8.

While the signal generator 1002 is sweeping the calibration signal through a range of frequencies, each analyzer 1050a, 1050b, and 1050c looks for a null or peak (depending on whether its communications channel is open or shorted, and whether the initial frequency of the calibration signal was based on a quarter wave or a half wave of the estimated length of the communications channel (see table II above)). Each analyzer may do so generally as shown and described above with respect to step 808 of FIG. 8. Each analyzer 1050a, 1050b, and 1050c sends data regarding detection of a null or peak to automatic calibration module 1022 via bus 1070. For example, each analyzer 1050a, 1050b, and 1050c may send to the automatic calibration module 1022 the frequency of the calibration signal that resulted in detection of the peak or the null.

At step 1108, the automatic calibration module 1022 receives the digital data from each of analyzers 1050a, 1050b, and 1050c regarding detection of a null of peak. At step 1110, the automatic calibration module calculates the propagation delay through each of the communications channels 1060a, 1060b, and 1060c, which may be done in the same general manner as step 810 in FIG. 8. At step 1112, the automatic calibration module 1022 sets a variable delay module 1030a, 1030b, and 1030c in each of communications channels 1060a, 1060b, and 1060c so that the overall propagation delay through all of the communications channels is equal to within a specified tolerance. For example, if channel 1060a is determined to have the longest propagation delay, automatic calibration module 1022 may do the following: set to zero the variable delay 1030a for channel 1060a, set the variable delay 1030b for channel 1060b to the difference between the measured delay of channel 1060a minus the measured delay of channel 1060b, and set the variable delay 1030c for channel 1060c to the difference between the measured delay of channel 106a minus the measured delay of channel 1060c. Automatic calibration module 1022 communicates with the variable delay modules 1030a, 1030b, and 1030c through bus 1070. Of course, the overall delay through the communications channels 1060a, 1060b, and 1060c need not be set such that all are equal. For example, the overall delays may be set so that there is a predetermined difference between the delays through the channels.

The automatic calibration module 1022 may comprise a processor operating under software (e.g., software, firmware, microcode, etc.) control and a memory for storing the software. The process of FIG. 11 may thus be implemented in software operating on a processor. Alternatively, the automatic calibration module 1022 may be hardwired to perform the process of FIG. 11, or the automatic calibration module 1022 may comprise both hardwired logic and a processor operating under software control.

The following illustrates an example showing operation of the process of FIG. 11:

At step 1102, the following parameters are received:

$\sqrt{e_r}$ is 2 estimated length ($L_{est}$) of each communications channel 1060a, 1060b, and 1060c is 15 centimeters each communications channel 1060a, 1060b, and 1060c is terminated in an open condition the process of FIG. 11 is to be conducted based on a quarter wave drive signal At step 1104, the initial frequency is calculated to be $f_o = 3 \times 10^8 \div (4*0.15*2)$, which equals 250 megahertz.

At step 1106, the frequency is swept through the range 250 megahertz to 260 megahertz.

At step 1108, data indicating that a null was detected at a frequency ($f_{xa}$) of 253 megahertz on communications channel 1060a, at a frequency ($f_{xb}$) of 255 megahertz on communications channel 1060b, and at a frequency ($f_{xc}$) of 258 megahertz on communications channel 1060c.

At step 1110, propagation delays (D) are calculated as follows for each of communications channel 1060a, 1060b, and 1060c as follows:

for communications channel 1060a, $D_a = 1 \div (4*253 \times 10^6)$, which is approximately 0.988 nanoseconds.

for communications channel 1060b, $D_b = 1 \div (4*255 \times 10^6)$, which is approximately 0.980 nanoseconds.

for communications channel 1060c, $D_c = 1 \div (4*258 \times 10^6)$, which is approximately 0.970 nanoseconds.

At step 1112, the overall delay through communications channels 1060a, 1060b, and 1060c are equalized by setting the variable delays 1030a, 1030b, and 1030c as follows:

variable delay 1030a set to zero.

variable delay 1030b set to 0.008 nanoseconds.

variable delay 1030c set to 0.018 nanoseconds.

As mentioned above, the distal ends (i.e., probes 910a, 910b, and 910c) of communications channels 1060a, 1060b, and 1060c may be terminated in either an open circuit or a short circuit condition. It is also possible to terminate the proximal ends 910a, 910b, and 910c (which are shown as probes in FIG. 10) of channels 1060a, 1060b, and 1060c by bringing them into contact with a DUT or other element with an impedance that is neither an open circuit nor a short circuit. (The proximal end 118 of transmission line 112 in FIG. 1 or 6 may be similarly terminated.) In such a case, the channel (or transmission line) would not be terminated in an open or a short but would be terminated in a known or unknown impedance. If the impedance is known, the fraction of a wavelength of a driving signal that that will cause a peak or null in a standing wave to occur at the proximal end of the transmission line can be calculated using a Smith chart. Any of the above described techniques may then be used to determine the length or propagation delay through the transmission line, except that the calculated-wavelength fraction would be used in place of ¼ wave or ½ wave.

Figure 12:
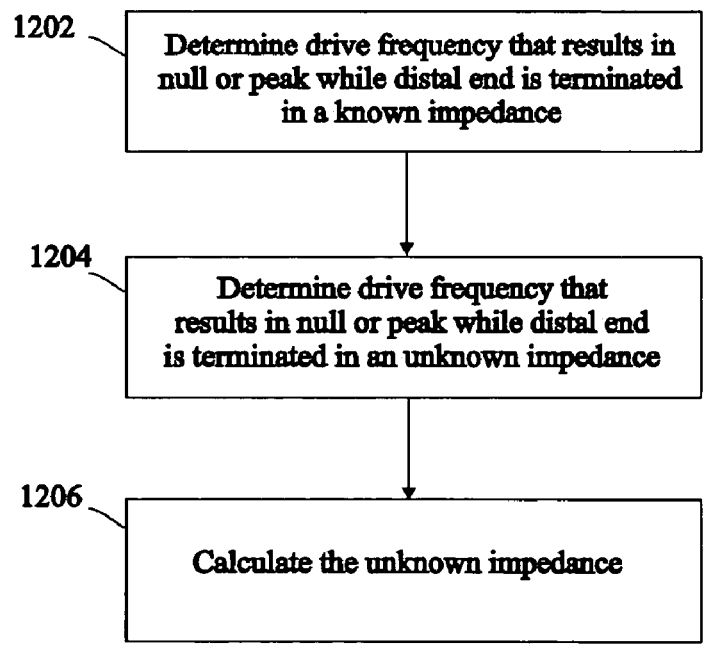
FIG. 12 illustrates an exemplary process for determining the value of an unknown impedance.

In fact, techniques such as those described above may be used to determine the value of an unknown impedance that terminates a transmission line (e.g., 112) or communications channel (e.g., 1060a). FIG. 12 illustrates an exemplary process for determining the value of an unknown impedance that terminates communications channel 1060a. At step 1202, the distal end 910a of communications channel 1060a is terminated in a known impedance (e.g., an open or a shorted condition) and the frequency of a drive signal that causes a null or peak to be detected at the proximal end 1010a of the communications channel is determined. This may be accomplished using steps similar to 302, 304, 306, and 308 in FIG. 3; steps 802, 804, 806, and 808 in FIG. 8; or steps 1102, 1104, 1106, and 1108 in FIG. 11. At step 1204, the distal end 910a of the communications channel 1060a is terminated in the unknown impedance and the frequency of a drive signal that causes a null or peak to be detected at the proximal end 1010a of the communications channel is again determined, which may be done in the same manner as in step 1202. At step 1206, the value of the unknown impedance is calculated. Knowing the frequency that caused a null or peak while the channel 1060a was terminated in a known impedance (e.g., an open or shorted condition) and the frequency that caused the null or peak while the channel was terminated with the unknown impedance, one can calculate the value of the unknown impedance. As one example, one may use known transmission line equations to calculate the unknown impedance. As another example, one may use a Smith chart to calculate the unknown impedance. (Use of a Smith chart, which shows curves of constant resistance and constant reactance representing load impedance at the end of a transmission line, is well known and fully explained in many reference sources. For example, Smith charts are explained in Hayt, "Engineering Electromagnetics," (McGraw-Hill, Inc. 1981), pp. 444-452, which is incorporated herein in its entirety by reference.) For example, the Smith chart may be used as follows: determine the shift in wavelength from the frequency that caused the null or peak while the communications channel was terminated in the known impedance (e.g., open or short) to the frequency that caused the null or peak with the channel terminated in the unknown impedance; determine a location on Smith chart that corresponds to the known impedance condition, and move from that location around the Smith chart by the amount of the wavelength shift; determine the real component of the unknown impedance from the voltage standing wave ratio that corresponds to the new location on the Smith chart; and determine the imaginary (reactive) component of the unknown impedance from the angle of the wavelength shift on the Smith chart.

It is also possible to deskew multiple transmission lines (e.g., communications channels 1060a, 1060b, and 1060c in FIG. 10) all of which are terminated in an unknown though equal impedance. Using the techniques described above, one would measure on each transmission line the frequency at which an estimated quarter wave or half wave signal causes a null or peak to appear at the proximal end of the transmission line. One could then deskew the transmission lines one with another using the differences between the measured quarter wave or half wave frequencies on each transmission line.

It should be noted that, although the input 126 of the envelope detector 122 of FIGS. 1 and 6 is described as detecting a voltage at the proximal end 110 of the transmission line 112, input 126 could be configured to detect the current through the proximal end 110 of the transmission line 112. For example, a resistance could be disposed between the output 108 of the driver 106 and the proximal end 110 of the transmission line 112 such that the resistance is in series with the output 108 of the driver 106 and the transmission line 112. One input terminal of a differential amplifier could then be connected to the output 108 of the driver 106, and the input terminal of the differential amplifier connected to the proximal end 110 of the transmission line 112. (The inputs of the differential amplifier may be AC coupled (e.g., with capacitors) to the output 108 of the driver 106 and the proximal end 110 of the transmission line 112.) The differential amplifier would thus be configured to amplify the difference between the voltage on one side of the resistance and the voltage on the other side of the resistance.

As is known, the voltage drop across a resistance is directly proportional to the current through the resistance. The output of the differential amplifier could then be connected to the envelope detector 122 in the system of either FIG. 1 or FIG. 6 and the systems of FIG. 1 or FIG. 6 operated as described above. FIGS. 2, 4a, 4b, 5a, and 5b would show current rather than voltage.

Although exemplary embodiments and applications of the invention have been described herein, there is no intention that the invention be limited to these exemplary embodiments and applications or to the manner in which the exemplary embodiments and applications operate or are described herein.

The invention claimed is:

1. A method of calibrating a plurality of communications channels, said method comprising:
   varying a frequency of a calibration signal driven into each of said communications channels, said calibration signal inducing a varying standing wave on each said communications channel;
   detecting a particular condition of said varying standing wave on each said communications channel;
   determining from said detected condition of said varying standing wave on each said communications channel a propagation delay through each said communications channel; and
   calibrating said communications channels,
   wherein said step of varying a frequency comprises varying said signal from an initial frequency through a range of frequencies, and wherein said initial frequency corresponds to one of a quarter wave, a half wave, or an integer multiple of a quarter wave or half wave with respect to an estimated length of one of said communications channels.

2. The method of claim 1, further comprising terminating said communications channels in one of a shorted condition or an open condition.

3. The method of claim 2, wherein said detecting step comprises detecting one of a null or a peak in an envelope of said varying standing wave on each said communications channel approximately at an end of each said communications channel into which said calibration signal is driven.

4. The method of claim 3, wherein said null or said peak in said envelope is detected by averaging two approximately equal values along said envelope.

5. The method of claim 3, wherein said propagation delay of each said communications channel is calculated from a frequency of said calibration signal at which said null or said peak is detected.

6. The method of claim 1, wherein:
   each said transmission line is terminated in an open condition;
   said detected condition of said varying standing wave on each said communications channel comprises a null of said varying standing wave on said communications channel at approximately an end of said communications channel into which said calibration signal is driven; and
   said determining step comprises calculating said propagation delay using a frequency of said calibration signal that resulted in said null at said end of said communications channel.

7. The method of claim 1, wherein:
   each said transmission line is terminated in an open condition;
   said varying step comprises varying said calibration signal from an initial frequency that corresponds to a half wave or an integer multiple of a half wave with respect to an estimated length of one of said communications channels;
   said detected condition of said varying standing wave on each said communications channel comprises a peak of said varying standing wave on said communications channel at approximately an end of said communications channel into which said calibration signal is driven; and
   said determining step comprises calculating said propagation delay using a frequency of said calibration signal that resulted in said peak at said end of said communications channel.

8. The method of claim 1, wherein:
   each said transmission line is terminated in an closed condition;
   said detected condition of said varying standing wave on each said communications channel comprises a peak of said varying standing wave on said communications channel at approximately an end of said communications channel into which said calibration signal is driven; and
   said determining step comprises calculating said propagation delay using a frequency of said calibration signal that resulted in said peak at said end of said communications channel.

9. The method of claim 1, wherein:
   each said transmission line is terminated in a closed condition;
   said varying step comprises varying said calibration signal from an initial frequency that corresponds to a half wave or an integer multiple of a half wave with respect to an estimated length of one of said communications channels;
   said detected condition of said varying standing wave on each said communications channel comprises a null of said varying standing wave on said communications channel at approximately an end of said communications channel into which said calibration signal is driven; and
   said determining step comprises calculating said propagation delay using a frequency of said calibration signal that resulted in said null at said end of said communications channel.

10. The method of claim 1, wherein said communications channels communicatively connect a tester to an electronics device under test.

11. The method of claim 10, wherein each said communications channel comprises a probe for contacting a terminal of said electronic device under test.

12. The method of claim 10, wherein said calibrating step comprises adjusting a variable propagation delay in at least one of said communications channels.

13. A method of calibrating a plurality of communications channels, said method comprising:
   selecting an initial frequency for a calibration signal, wherein said initial frequency corresponds to one of a quarter wave, a half wave, or an integer multiple of a quarter wave or a half wave of an estimated length of one of said communications channels;
   driving said calibration signal into a plurality of communications channels;
   sweeping said calibration signal through a range of frequencies;

for each said communications channel, determining a frequency in said range that causes a particular waveform condition to appear on each of said communications channels; and for each said communications channel, using said frequency to determine a propagation delay through said communications channels, said method further comprising at least one of:

storing, reporting, displaying, or presenting to a user said propagation delay, utilizing said propagation delay to calibrate said plurality of communications channels, or outputting a signal corresponding to said propagation delay to a display device, an electronic storage device, or as a control signal.

14. The method of claim 13, wherein each said communications channel is terminated in one of a shorted condition or an open condition.

15. The method of claim 14, wherein said particular waveform condition comprises one of a null or a peak in an envelope of a varying standing wave on each said communications channel, wherein said null or said peak is detected approximately at an end of each said communications channel into which said calibration signal is driven.

16. The method of claim 15, wherein said null or said peak in said envelope is detected by averaging two approximately equal values along said envelope.

17. The method of claim 13, further comprising storing, reporting, displaying, or presenting to a user said propagation delay.

18. The method of claim 13, further comprising utilizing said propagation delay to calibrate said plurality of communications channels.

19. The method of claim 13, further comprising outputting a signal corresponding to said propagation delay to a display device, an electronic storage device, or as a control signal.

20. An apparatus for calibrating a plurality of communications channels of a test system, wherein said test system comprises drivers for driving test data through said communications channels to terminals of an electronic device under test, and wherein each said communications channel terminates in a probe for contacting one of said terminals of said electronic device, said apparatus comprising:

a signal generator configured to sweep a calibration signal from an initial frequency through a range of frequencies, wherein said calibration signal is input into said drivers and driven onto said communications channels;

a plurality of envelope detectors each having an input connected to a drive end of one of said communications channels; and a plurality of wave form detectors each connected to an output of one of said envelope detectors, each said wave form detector configured to detect one of a null or a peak.

21. The apparatus of claim 20 further comprising means for determining, using frequencies of said calibration signal at which each of said wave form detectors detected one of a null or a peak, a propagation delay for each of said communications channels.

22. The apparatus of claim 21 further comprising means for deskewing said communications channels.

23. The apparatus of claim 20, wherein said initial frequency corresponds to one of a quarter wave, a half wave, or an integer multiple of a quarter wave or a half wave of an estimated length of one of said communications channels.

24. A machine readable medium comprises instructions for causing said machine to perform a method, said method comprising:

selecting an initial frequency for a calibration signal, wherein said initial frequency corresponds to one of a quarter wave, a half wave, or an integer multiple of a quarter wave or a half wave of an estimated length of one of said communications channels;

driving said calibration signal into a plurality of communications channels;

sweeping said calibration signal through a range of frequencies;

for each said communications channel, determining a frequency in said range that causes a particular waveform condition to appear on each of said communications channels; and for each said communications channel, using said frequency to determine a propagation delay through said communications channels, said method further comprising at least one of:

storing, reporting, displaying, or presenting to a user at least one of said propagation delays, utilizing said propagation delays to calibrate said plurality of communications channels, or outputting a signal corresponding to said propagation delay determined for at least one of said channels to a display device, an electronic storage device, or as a control signal.

25. The machine readable medium of claim 24, wherein each said communications channel is terminated in one of a shorted condition or an open condition.

26. The machine readable medium claim 25, wherein said particular waveform condition comprises one of a null or a peak in an envelope of a varying standing wave on each said communications channel, wherein said null or said peak is detected approximately at an end of each said communications channel into which said calibration signal is driven.

27. The machine readable medium 26, wherein said null or said peak in said envelope is detected by averaging two approximately equal values along said envelope.

28. The machine readable medium of claim 24, wherein said method further comprises storing, reporting, displaying, or presenting to a user at least one of said propagation delays.

29. The machine readable medium of claim 24, wherein said method further comprises utilizing said propagation delays to calibrate said plurality of communications channels.

30. The machine readable medium of claim 24, wherein said method further comprises outputting a signal corresponding to said propagation delay determined for at least one of said channels to a display device, an electronic storage device, or as a control signal.

31. A method of determining a value of an impedance, said method comprising:

determining a first frequency of a calibration signal driven onto a proximal end of a transmission line while said transmission line is terminated in a known impedance that causes a particular condition in a varying standing wave on said transmission line, wherein said determining a first frequency comprises detecting said particular condition on said transmission line;

determining a second frequency of said calibration signal while said transmission line is terminated in an unknown impedance that causes said particular condition on said transmission line;

calculating a value of said unknown impedance; and making said calculated value of said unknown impedance available to a human user.

32. The method of claim 31, wherein said known impedance is one of an open or a short.

33. The method of claim 32, wherein said first frequency corresponds to one of a quarter wave, a half wave, or an integer multiple of a quarter wave or a half wave of a length of said transmission line.

34. The method of claim 33, wherein said step of determining said first frequency comprises sweeping a frequency of said calibration signal from an estimated quarter wave, a half wave, or an integer multiple of a quarter wave or a half wave signal through a range of frequencies.

35. The method of claim 34, wherein said step of determining said second frequency comprises sweeping a frequency of said calibration signal from said estimated quarter wave or, a half wave, or an integer multiple of a quarter wave or a half wave signal through said range of frequencies.

36. The method of claim 31, wherein said calculating comprises calculating said value of said unknown impedance from said first frequency, said second frequency, and said known impedance.

37. The method of claim 31, wherein said determining a first frequency comprises:

driving said calibration signal onto said proximal end of said transmission line while said transmission line is terminated in said known impedance;

varying a frequency of said calibration signal; and determining a frequency of said calibration signal at which said particular condition in said standing wave on said transmission line occurs, wherein said determined frequency is said first frequency.

38. The method of claim 37, wherein said determining a second frequency comprises:

driving said calibration signal onto said proximal end of said transmission line while said transmission line is terminated in said unknown impedance;

varying a frequency of said calibration signal; and determining a frequency of said calibration signal at which said particular condition in said standing wave on said transmission line occurs, wherein said determined frequency is said second frequency.

39. The method of claim 31, wherein said determining a second frequency comprises detecting said particular condition on said transmission line.

* * * * *